United States Patent
Kim et al.

(10) Patent No.: US 6,724,696 B2
(45) Date of Patent: Apr. 20, 2004

(54) FOUR-AXIAL DRIVING ACTUATOR FOR OPTICAL PICKUP

(75) Inventors: Seok-jung Kim, Suwon-si (KR); Yong-hoon Lee, Suwon-si (KR); Tae-yong Doh, Suwon-si (KR); Sun-mo Kim, Deejeon Metropolitan (KR); Han-kook Choi, Suwon-si (KR)

(73) Assignee: Samsung Electronics, Co., Ltd., Suwon (KR)

( * ) Notice: Subject to any disclaimer, the term of this patent is extended or adjusted under 35 U.S.C. 154(b) by 251 days.

(21) Appl. No.: 09/938,311

(22) Filed: Aug. 24, 2001

(65) Prior Publication Data

US 2002/0071358 A1 Jun. 13, 2002

(30) Foreign Application Priority Data

Dec. 8, 2000 (KR) ......................................... 2000-74796

(51) Int. Cl.[7] .................................................. G11B 7/00
(52) U.S. Cl. ................................. 369/44.16; 369/44.14; 359/823
(58) Field of Search ............................ 369/44.11, 44.14, 369/44.15, 44.22, 44.27; 359/823, 824, 813, 814

(56) References Cited

U.S. PATENT DOCUMENTS 6,091,553 A * 7/2000 Song et al. .............. 369/44.14
6,501,710 B2 * 12/2002 Yokoyama et al. ...... 369/44.14
6,507,554 B2 * 1/2003 Son et al. ................... 369/244

* cited by examiner

*Primary Examiner*—Muhammad Edun
(74) *Attorney, Agent, or Firm*—Staas & Halsey LLP

(57) ABSTRACT

A four-axial driving actuator for an optical pickup with improved bobbin dynamic characteristics, in which the winding starting ports for a focus coil, tracking coil, and tilt coil are separate from one another, and the winding end ports thereof are combined as a common ground. The four-axial driving actuator includes: a base; a holder fixed on the base; a bobbin to which an objective lens is fixed; spring wires connected between the bobbin and the holder; and a magnetic driving unit driving the bobbin in the focus, track, or tilt direction with a focus coil, a tracking coil, and a tilt coil, wherein the magnetic driving unit comprises a circuit unit including winding starting ports for the focus coil, tracking coil, and tilt coil, and a common ground port at which winding end ports for the focus coil, tracking coil, and tilt coil are grounded, and the circuit unit applies a voltage to the tracking coil, tracking coil, and tilt coil. In the four-axial driving actuator for an optical pickup, the bobbin and the holder are connected with only four wires serving as electric wires, so that moving characteristics of the bobbin are improved and the assembly time is reduced.

11 Claims, 5 Drawing Sheets

FOUR-AXIAL DRIVING ACTUATOR FOR OPTICAL PICKUP

CROSS-REFERENCE TO RELATED APPLICATIONS

This application claims the benefit of Korean Patent Application No. 2000-74796 filed on Dec. 8, 2000, in the Korean Industrial Property Office, the disclosure of which is incorporated herein by reference.

BACKGROUND OF THE INVENTION

1. Field of the Invention

The present invention relates to a four-axial driving actuator for an optical pickup, and more particularly, to a four-axial driving actuator for an optical pickup in which the winding starting ports of a focusing coil, tracking coil, and tilt coil are separate from one another and the winding end ports thereof are combined as a common ground so that moving characteristics of a bobbin are improved.

2. Description of the Related Art

In general, an optical pickup is a device employed in an optical recording/reproduction apparatus to record information on and/or reproduce information from a disc mounted as a recording medium on a turn table in a non-contact manner while moving in the radial direction of the disc. The optical pickup includes an objective lens that focuses a beam emitted from a light beam source to form a beam spot on the disc, and an actuator that controls the objective lens in the track direction, focus direction, and tilt direction such that the beam spot from the objective lens can be accurately focused on an intended position in the optical disc.

An actuator for an optical pickup is classified as either a hinged type, plate spring type, wire type, or an axial sliding type according to its bobbin support structure. The wire type is advantageous in that current can be supplied to a driving coil using a wire supporting the bobbin.

Referring to FIG. 1, a conventional wire-type optical pickup actuator includes a base 100, a holder 103 fixed on the base 100, a bobbin 107 to which the objective lens 105 is fixed, wires connected between the bobbin 107 and the holder 103, and a magnetic driving unit driving the bobbin 107 in the track, focus or tilt direction.

The magnetic driving unit includes a first magnet 110 and a second magnet 112, each facing a corresponding first and second magnet 110 and 112, respectively, with the bobbin 107 therebetween, an outer yoke 115 which is mounted on the base 100 and to which the first magnet 110 is fixed, an inner yoke 117 mounted on the base 100 facing one of the first magnets 110 to guide the bobbin 107, a focusing coil 120 wound around the outer wall of the bobbin 107, a tracking coil 122 wound at the side wall of the bobbin 107 facing one of the first magnets 110, and portions of a tilt coil 125 wound at each of the side walls of the bobbin 107 facing the second magnets 112.

FIG. 2 is a front view of the bobbin 107 of FIG. 1. Referring to FIGS. 1 and 2, the wires includes focusing coil wires 130 connecting the focusing coil 120 to the winding starting port 127 and the winding end port 129 thereof, tracking coil wires 135 connecting the tracking coil 122 to the winding starting port 132 and the winding end port 133 thereof, and tilt coil wires 140 connecting the tilt coil 125 to the winding starting port 137 and the winding end port 139 thereof. The wires 130, 135, and 140 serve as a support for the bobbin 107 driven by the magnetic driving unit by connecting the bobbin 107 to the holder 103, as well as serving as electric wires through which current is applied to the focusing coil 120, the tracking coil 122, and the tilt coil 125.

A general actuator includes four wires including a pair of focus coil spring wires 130 and a pair of tracking coil spring wires 135. In addition, tilt coil spring wires may be elastically connected between the bobbin 107 and the holder 103 to support the bobbin 107, further elastically biasing the bobbin 107 toward the holder 103. As a result, motion of the bobbin 107 is further limited. Taking into account this problem, the tilt coil wires 140 are arranged loosely over the holder 103 and connected to the rear wall of the holder 103, as shown in FIG. 1.

The bobbin 107 is driven by the magnetic driving unit having the configuration above in four axial directions, i.e., in the focus direction A, track direction B, tangential tilt direction C, and radial tilt direction D. FIG. 3 shows a voltage apply circuit for each of the coils. Although the circuit for only the focusing coil 120 is illustrated here, the tracking coil 122 and the tilt coil 125 have the same structure.

Referring to FIG. 3, the focus coil circuit includes an input generator 145, comparators 147, the winding starting port 127 of the focusing coil 120 to which a driving voltage is applied from one of the comparators 147, and the winding end port 129 through which a current flowing through the focusing coil 120 is output. This circuit structure is also applied to both the tracking coil 122 and the tilt coil 125, and thus a total six wires are needed for the actuator.

In the conventional four-axial driving actuator having the configuration above, the six wires are complexly arranged, and moving characteristics of the bobbin 107 are affected by the length or position of the tilt coils 125, causing a secondary resonance or a rolling of the bobbin 107 to occur in driving the bobbin 107.

SUMMARY OF THE INVENTION

To solve the above and other problems, it is an object of the present invention to provide a four-axial driving actuator for an optical pickup, in which the winding starting ports of a focusing coil, a tracking coil, and a tilt coil are separate from one another and the winding end ports thereof are combined as a common ground so that moving characteristics of a bobbin are improved.

Additional objects and advantages of the invention will be set forth in part in the description which follows and, in part, will be obvious from the description, or may be learned by practice of the invention.

The foregoing objects of the present invention are achieved by providing a four-axial driving actuator for an optical pickup, comprising: a base; a holder fixed on the base; a bobbin to which an objective lens is fixed; spring wires connected between the bobbin and the holder; and a magnetic driving unit driving the bobbin in the focus, track, or tilt direction with a focusing coil, a tracking coil, and a tilt coil, wherein the magnetic driving unit comprises a circuit unit including winding starting ports for the focusing coil, tracking coil, and tilt coil, and a common ground port at which winding end ports for the focusing coil, tracking coil, and tilt coil are grounded, and the circuit unit applies a voltage to the focusing coil, tracking coil, and tilt coil.

The magnetic driving unit may comprise a first magnet and a second magnet, each facing a corresponding first and second magnet, respectively, with the bobbin therebetween; an outer yoke which is mounted on the base and to which a first magnet is fixed; and an inner yoke mounted on the base facing the first magnet to guide the bobbin, wherein the focusing coil is wound around the outer wall of the bobbin, the tracking coil is wound at the side wall of the bobbin facing the first magnet, and the tilt coil is wound at the side wall of the bobbin facing the second magnet. It is to be noted that the positioning of the magnets, and also the number of magnets used shall not be limited by this description, but may vary such that the desired effect is obtained.

The circuit unit may also comprise an input generator to generate a voltage to be applied to the focusing coil, tracking coil, or tilt coil; and a filter that removes a high-frequency noise component from the voltage applied from the input generator to supply a noise-free voltage to the focusing coil, tracking coil, or tilt coil. In the alternative, a separate input generator may be provided for each of the focusing coil, tracking coil, and tilt coil.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENTS

Figure 1:
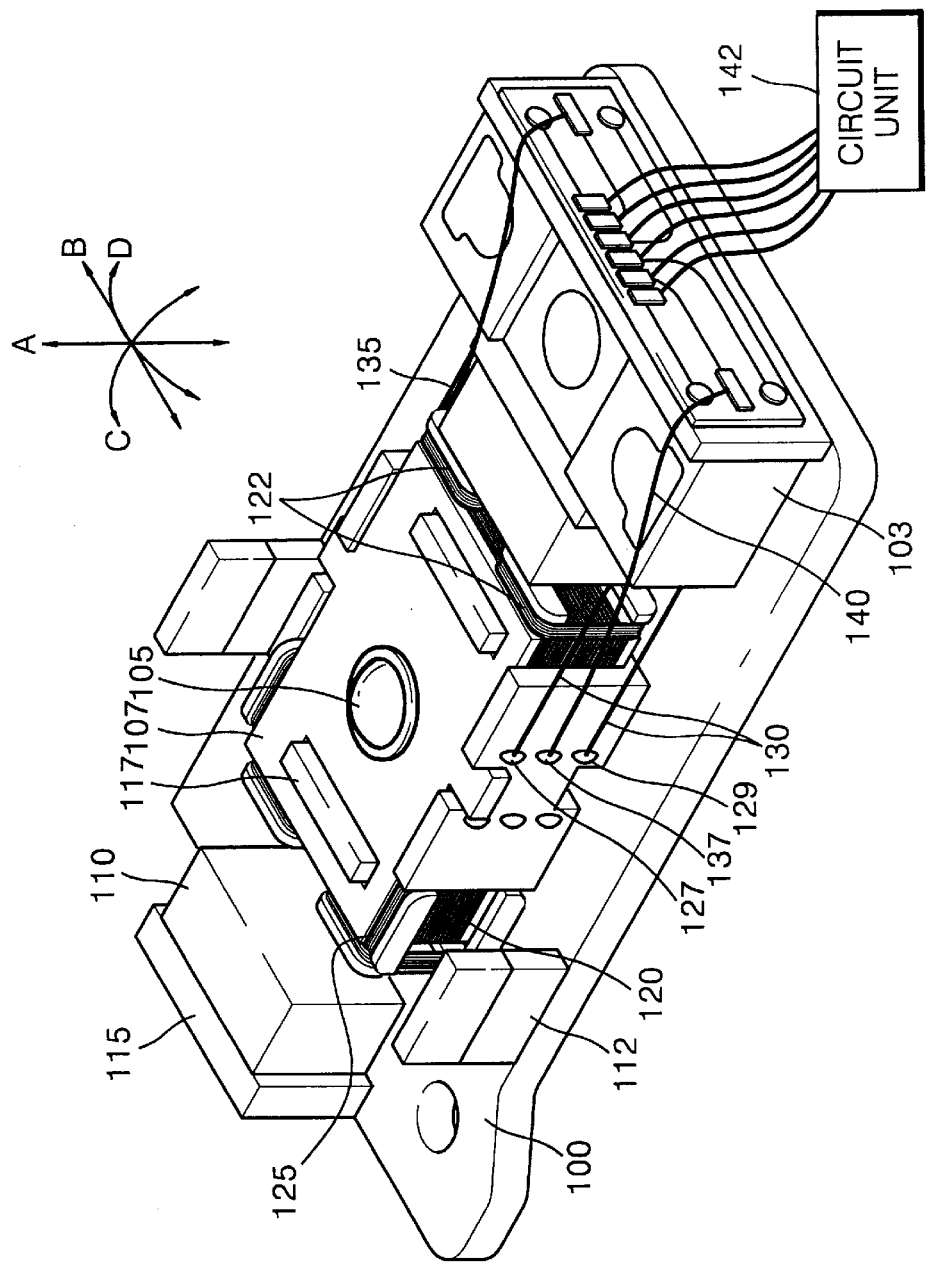
FIG. 1 is a perspective view of a conventional four-axial driving actuator for an optical pickup.
Figure 2:
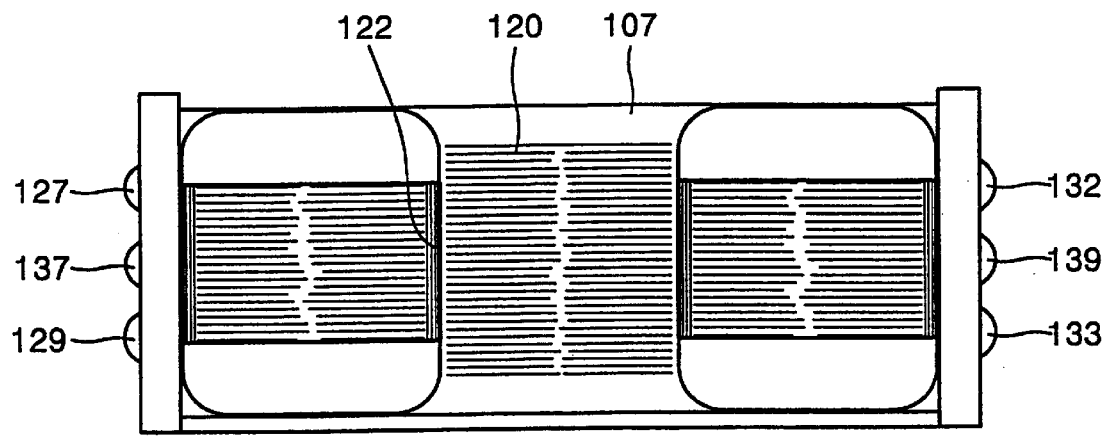
FIG. 2 is a front view of the bobbin of FIG. 1.
Figure 3:
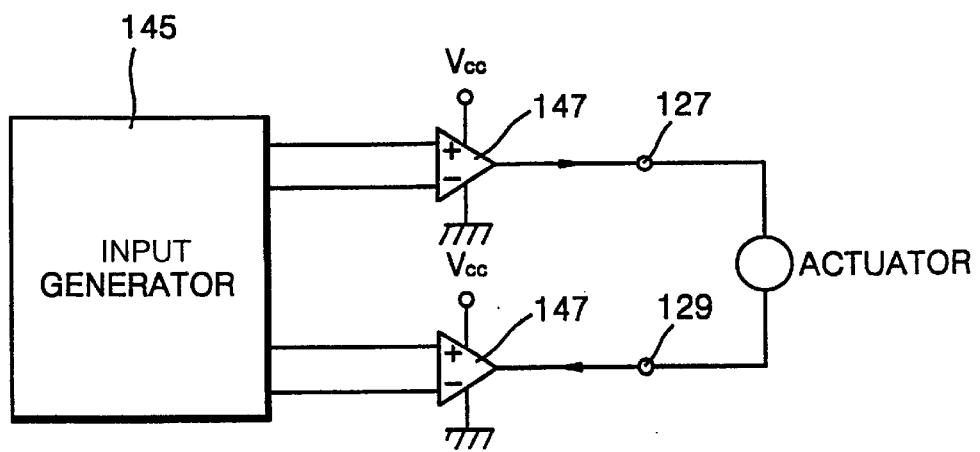
FIG. 3 is a block diagram of the circuit unit of the four-axial driving actuator of FIG. 1.

Reference will now be made in detail to the embodiments of the present invention, examples of which are illustrated in the accompanying drawings, wherein like reference numerals refer to the like elements throughout. The embodiments are described below in order to explain the present invention by referring to the figures.

Figure 4:
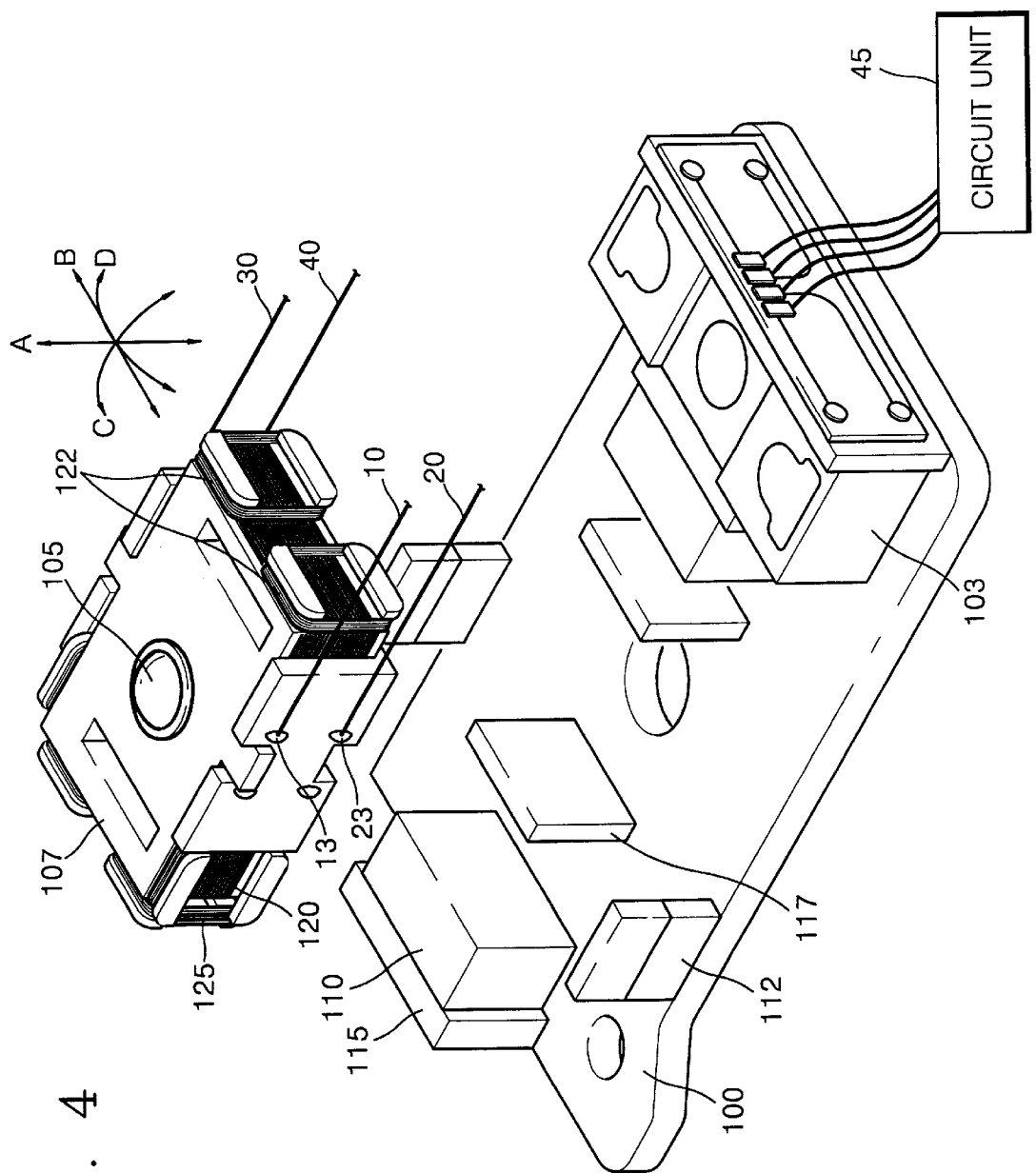
FIG. 4 is an exploded perspective view of a four-axial driving actuator according to a preferred embodiment of the present invention.

In FIG. 4, the same reference numerals as those used in FIG. 1 denote the same elements as those shown in FIG. 1. As shown in FIG. 4, an embodiment of a four-axial driving actuator for an optical pickup according to the present invention includes a focusing coil spring wire 10, a tracking coil spring wire 20, and a tilt coil spring wire 30 as wires connecting the holder 103 and the bobbin 107. A common ground spring wire 40 commonly grounding the focusing coil 120, the tracking coil 122, and the tilt coil 125 is further included. Thus, a total of four wires is used.

Figure 5:
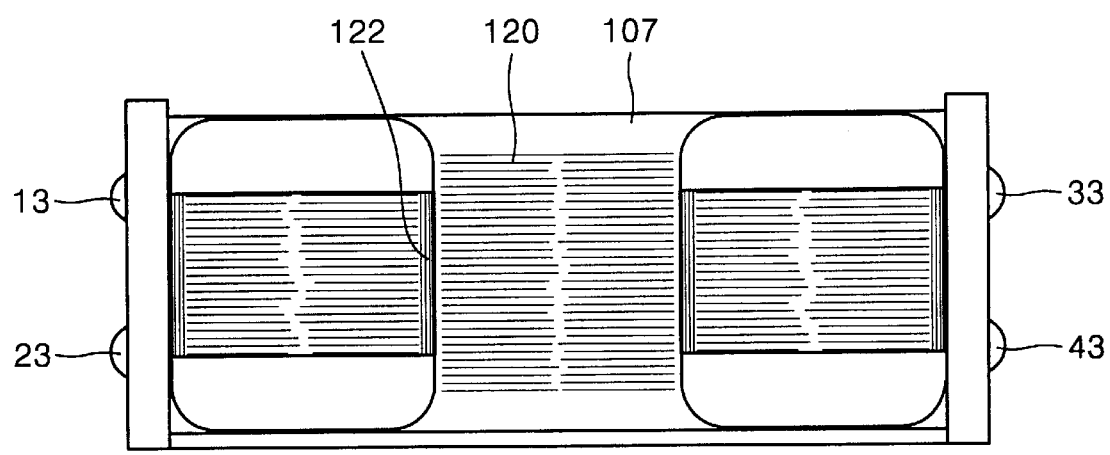
FIG. 5 is a front view of the bobbin of FIG. 4.

In FIG. 5, a winding starting port 13 of the focusing coil 120, a winding starting port 23 of the tracking coil 122, a winding starting port 33 of the tilt coil 125, and a common ground port 43 commonly grounding the focusing coil 120, the tracking coil 122, and the tilt coil 125 are shown. The winding starting ports 13, 23 and 33, and the common ground port 43 may be variously arranged exclusive of the arrangement of FIG. 5.

Figure 6:
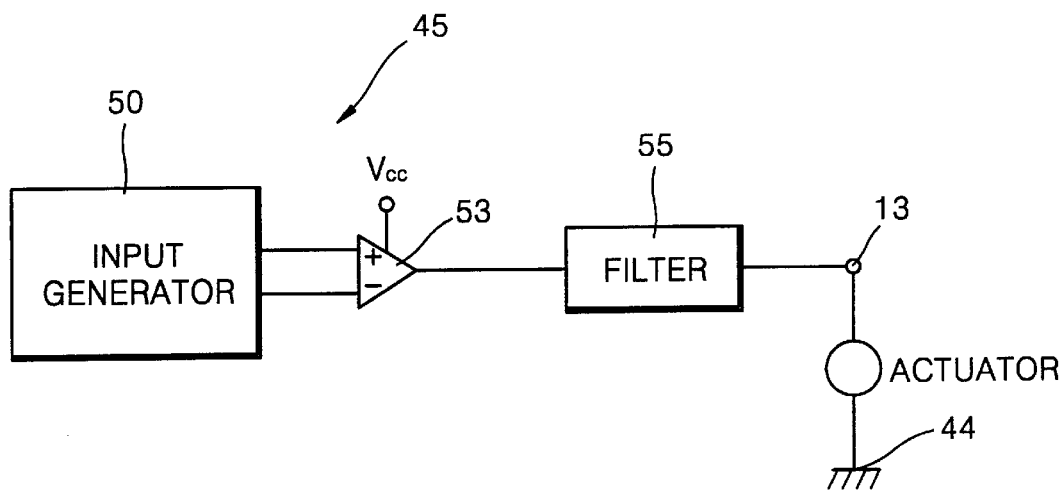
FIG. 6 is a block diagram of the circuit unit of the four-axial driving actuator according to the present invention.

The structure of a circuit unit 45, which electrically operates the configuration above, is shown in FIG. 6. In FIG. 6, a structure that applies a voltage to only the focusing coil 120 is shown. A voltage is supplied from an input generator to the winding starting port 13 of the focus coil 120 through a comparator 53 and a filter 55. Noise is removed by the filter 55. This circuit structure is also applied to each of the tracking coil 122 and the tilt coil 125. Here, the filter 55 is a low-pass filter that removes high-frequency noise.

Figure 7:
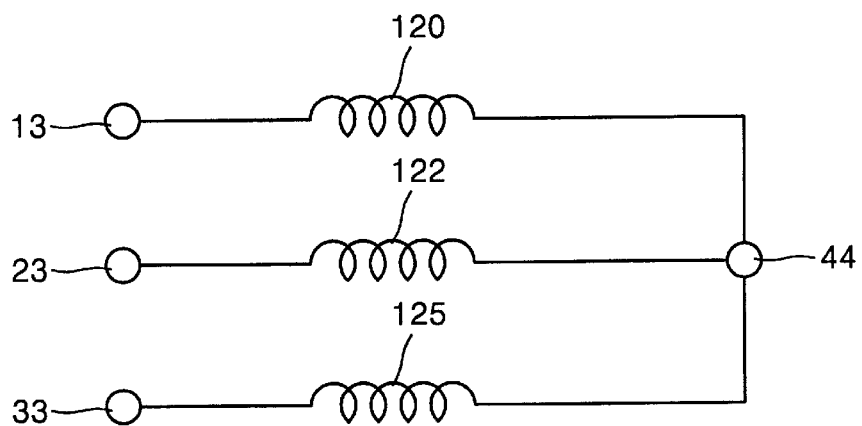
FIG. 7 shows a method of winding coils of the four-axial driving actuator according to the present invention.

In winding the coils, as shown in FIG. 7, a winding starts from each of the winding starting ports 13, 23, and 33 of the focusing coil 120, tracking coil 122 and tilt coil 125 such that each of the coils 120, 122 and 125 is wound around a predetermined position of the bobbin 170. The winding end ports of the focusing coil 120, tracking coil 122 and tilt coil 125 are commonly grounded at the common ground port 44. Four spring wires 10, 20, 30, and 40 extend from the winding starting ports 13, 23, and 33, and the common ground port 44, respectively, to the holder 103.

In electric operation of the four-axial driving actuator according to the present invention having the configuration described above, as a voltage is applied to the focus coil spring wire 10, tracking coil spring wire 20, and tilt coil spring wire 30 from corresponding input generators 50 through corresponding comparators 53 and filters 55, a current flows through the focus coil 120, tracking coil 122, and tilt coil 125. According to the Fleming's left-hand rule acting between the current flowing through the coils 120, 122, and 125 and each of the pair of first and second magnets 110 and 112, the bobbin 107 moves in either the focus direction A, track direction B, tangential tilt direction C, or radial tilt direction D.

As described above, the four-axial driving actuator according to the present invention is operable with only four spring wires even when the tilt coil 125 to correct the tilt error as well as the focusing coil 120 and the tracking coil 22 are adopted. Thus, the motion of the bobbin in the focus, track, and tilt directions can be easily controlled, compared with a conventional structure in which the bobbin and the holder are connected using six spring wires, or four spring wires and two tilt coil wires.

As described above, the four-axial driving actuator for an optical pickup according to the present invention has the circuit structure in which the winding starting ports for the focus coil, tracking coil, and tilt coil are separate from one another, and the winding ending ports are combined as the common ground port, so that the number of wires decreases and thus the assembly time is reduced. In addition, due to the reduced number of the wires connecting the bobbin and the holder, moving characteristics of the bobbin are improved.

Although preferred embodiments of the present invention have been shown and described, it will be appreciated by those skilled in the art that changes may be made in these embodiments without department from the principle and spirit of the invention, the scope of which is defined in the appended claims and their equivalents.

What is claimed is:

1. A four-axial driving actuator for an optical pickup, comprising:
   a base;
   a holder fixed on the base;
   a bobbin to which an objective lens is fixed;
   spring wires connected between the bobbin and the holder; and
   a magnetic driving unit driving the bobbin in the focus, track, or tilt direction with a focusing coil, a tracking coil, and a tilt coil, wherein the magnetic driving unit comprises a circuit unit including winding starting ports for the focusing coil, tracking coil, and tilt coil, and a common ground port at which winding end ports for the focusing coil, tracking coil, and tilt coil are grounded, and the circuit unit applies corresponding voltages to the focusing coil, tracking coil, and tilt coil.

2. The four-axial driving actuator of claim 1, wherein the magnetic driving unit further comprises:

a first magnet and a second magnet, each facing a corresponding pair of first and second magnets, respectively, with the bobbin therebetween;

an outer yoke which is mounted on the base and to which one of the first magnets is fixed; and an inner yoke mounted on the base facing said one of the first magnets to guide the bobbin, wherein the focusing coil is wound around an outer wall of the bobbin, the tracking coil is wound at the side walls of the bobbin facing the first magnets, and the tilt coil is wound at the side walls of the bobbin facing the second magnets.

3. The four-axial driving actuator of claim 2, wherein the circuit unit comprises:

an input generator generating the corresponding voltage to be applied to the focusing coil, tracking coil, or tilt coil; and a filter removing a high-frequency noise component from the corresponding voltage applied from the input generator to supply a noise-free voltage to the focusing coil, tracking coil, or tilt coil.

4. The four-axial driving actuator of claim 3, further comprising a comparator between the input generator and the filter.

5. The four-axial driving actuator of claim 1, wherein the circuit unit comprises:

an input generator generating the corresponding voltage to be applied to the focus coil, tracking coil, or tilt coil; and a filter removing a high-frequency noise component from the corresponding voltage applied from the input generator to supply a noise-free voltage to the focusing coil, tracking coil, or tilt coil.

6. A driving actuator for an optical pickup, comprising:

a base having first and second magnets and a holder;

a bobbin having an objective lens, a focusing coil, a tracking coil and a tilt coil;

wires connected between the bobbin and the holder; and a magnetic drive unit driving the bobbin by interacting with the first and second magnets, wherein the magnetic drive unit comprises a circuit unit applying corresponding voltages to a first end of the focusing coil, the tracking coil, and the tilt coil, and a common ground connected to a second end of each of the focusing coil, the tracking coil, and the tilt coil.

7. The driving actuator according to claim 6, wherein the circuit unit comprises an input generator applying the corresponding voltages to the focusing coil, the tracking coil and the tilt coil, and a filter that removes high-frequency noise from the voltages applied by the input generator.

8. The driving actuator according to claim 6, wherein the circuit unit comprises a first input generator applying a voltage to the focusing coil, a second input generator applying a voltage to the tracking coil, and a third input generator applying a voltage to the tilt coil.

9. The driving actuator according to claim 6, further comprising:

a focusing coil winding starting port;

a tracking coil wind starting port;

a tilt winding starting port; and a winding end port;

wherein the focusing coil winding starting port and the tracking coil starting port are positioned on one side of the bobbin and separate from each other and the tilt winding starting port and winding end port are positioned on an opposite side of the bobbin and spaced apart from each other, the winding end port receiving and connecting second ends of the focusing coil, tracking coil and tilt coil.

10. The driving actuator according to claim 9, wherein the focusing coil is wrapped around the side of the bobbin.

11. The driving actuator according to claim 10, wherein portions of the tracking coil are positioned at opposite sides of the bobbin facing the first magnets and portions of the tilt coil are positioned at remaining opposite sides of the bobbin facing the second magnets.

* * * * *

UNITED STATES PATENT AND TRADEMARK OFFICE
CERTIFICATE OF CORRECTION

PATENT NO.     : 6,724,696 B2
DATED          : April 20, 2004
INVENTOR(S)    : Seok-jung Kim et al.

It is certified that error appears in the above-identified patent and that said Letters Patent is hereby corrected as shown below:

<u>Title page,</u>
Item [75], Inventors, replace "Deejeon Metropolitan" with -- Daejeon Metropolitan City --.

Signed and Sealed this

Twenty-seventh Day of July, 2004

JON W. DUDAS
*Acting Director of the United States Patent and Trademark Office*